United States Patent [19]
Baumann

[11] Patent Number: 6,086,763
[45] Date of Patent: Jul. 11, 2000

[54] DISK, IN PARTICULAR THE FRONT DISK OF A FILTER ELEMENT

[75] Inventor: Dieter Baumann, Greven, Germany

[73] Assignee: Ing. Walter Hengst GmbH & Co., Munster, Germany

[21] Appl. No.: 09/171,476

[22] PCT Filed: Feb. 6, 1998

[86] PCT No.: PCT/EP98/00638

§ 371 Date: Oct. 19, 1999

§ 102(e) Date: Oct. 19, 1999

[87] PCT Pub. No.: WO98/36817

PCT Pub. Date: Aug. 27, 1998

[30] Foreign Application Priority Data

Feb. 20, 1997 [DE] Germany .............................. 197 06 921

[51] Int. Cl.[7] ...................................................... B01D 27/00
[52] U.S. Cl. ................. 210/497.01; 210/450; 210/493.2; 55/502; 277/640; 277/651; 277/944
[58] Field of Search .............................. 285/110; 277/437, 277/619, 624, 627, 640, 650, 651, 918, 944; 210/450, 493.2, 497.01; 55/502, 507, 509

[56] References Cited

U.S. PATENT DOCUMENTS

| | | | |
|---|---|---|---|
| 5,660,729 | 8/1997 | Baumann | 210/457 |
| 5,736,040 | 4/1998 | Duerrstein et al. | 210/437 |

FOREIGN PATENT DOCUMENTS

| | | |
|---|---|---|
| 0 559 011 A1 | 2/1993 | European Pat. Off. . |
| 44 16 577 A1 | 5/1994 | Germany . |
| 44 19 360 C1 | 6/1994 | Germany . |

*Primary Examiner*—Matthew O. Savage
*Attorney, Agent, or Firm*—Hill & Simpson

[57] ABSTRACT

A combination disc and sealing ring for a filter assembly is provided. The disc is an annular thermoplastic disc having a central aperture. The disc includes an upper side and a lower side and the upper side of the disc includes an annular thickened area that extends upward from the upper side of the disc and that is spaced radially outward from the aperture of the disc. The annular thickened area is thermally welded to a sealing ring. The height of the annular thickened area is at least one-third the height of the sealing ring. The sealing ring further includes a central aperture that has a common axis with the central aperture of the disc. The sealing ring also includes a compressible area radially disposed between the aperture of the sealing ring and the annular thickened area of the disc.

31 Claims, 4 Drawing Sheets

DISK, IN PARTICULAR THE FRONT DISK OF A FILTER ELEMENT

BACKGROUND OF THE INVENTION

Field of the Invention

The present invention relates to a front disc of a filter insert.

A disc is known as a part of a filter insert from DE 44 16 577 A1. The FIG. 6 of this document discloses a disc which in its area adjacent to the aperture is continuously slightly thickened, and is thermally welded in this thickened area with the sealing. The welding in this case extends across approximately the total surface area of the thickened area inwards in the area of the aperture, the sealing projects such that after plugging the disc onto a connection piece it is compressed and upset whereby the required sealing effect is attained.

With this known disc sealing combination, with only little effort, a sufficiently safe sealing could be attained, however, it has been found in practical operation that during the manufacturing relatively small tolerances have to be maintained in order to ensure a safe sealing on the one hand, and on the other hand, to avoid a too tight fit of the disc on the connection piece, and that furthermore it is desirable to make the manufacturing of the disc even more economical by accelerating the welding process when connecting the disc and the sealing.

SUMMARY OF THE INVENTION

It is proposed for attaining the object to provide a disc of the type mentioned before which is characterized in that the thickening is formed at the disc as a welding build-up positioned radially spaced outwards continuously around the aperture, that, with the disc plugged onto the connection piece, the sealing ring is compressed in its area between the connection piece and the welding build-up, and that the sealing effect is attained by the compressed area generated by the material of the sealing ring being upset radially outwards and thereby compressed.

With the disc according to the present invention, several advantages are attained, namely on the one hand an improved sealing effect with reduced requirements to the tolerances during the manufacturing, and on the other hand a faster manufacturing of the disc by reducing the required welding time. The improved sealing effect is attained in that the radially inner area of the sealing which serves for the sealing may move across a larger radial area independent from the disc for a compression in radial direction. With the arrangement according to the invention, in particular by the radial spacing of the welding build-up from the aperture a spacially defined compression area for the sealing ring is provided wherein the compression area when viewed in radial direction of the disc has a significantly larger extension as it is in a disc according to the state of the art according to the document stated in the beginning with a sealing ring attached to the thickening. This enlargement of the compression area in radial direction of the disc on the one hand results in a relatively easy plugging onto and drawing off the disc from the associated connection piece, and on the other hand, guarantees the required sealing without the occurance of a wedging of the sealing ring between the connection piece and the disc in the area of its aperture which would counteract the easy movement. It is a surprise that in spite of the relatively large spacing of the area of the welding connection between the disc and the sealing ring from the inner edge of the sealing ring the ring will reliably seal. As the welding connection is restricted to the area at the upper side of the welding build-up, the compression area provided for the compression of the sealing ring in radial direction is exactly defined although plastic material fleece or felt is used as a material for the sealing which as such has only a relatively low form stability. With the welding build-up according to the invention because of its relatively large height it is furthermore attained that the sealing effect between the connection piece and the disc is guaranteed independent from the plugging direction of the disc onto the connection piece. The flapping of the radially inner area of the sealing ring and a wedging between the outer circumference of the connection piece and the inner circumference of the disc for attaining the required sealing effect is no longer required.

Preferably, it is provided in an embodiment of the disc that the welding build-up at its flank facing the aperture extends perpendicularly in relation to the plane of the disc. This form of the welding build-up guarantees that the support effect thereof in relation to the sealing ring with the compression in radial direction thereof is constant independent from the level. Only a very slight deforming bevelling may be provided in case the disc is manufacturing as an injection molding part.

A preferred cross-section of the welding build-up of the disc is the rectangle. With this form a relatively large surface at the upper side of the welding build-up is attained while using only minimal material for the disc with the upper side serving for the welding with the sealing ring.

Furthermore it is preferably provided that the width of the welding build-up is between 15 and 45% of the width of the sealing ring as viewed in radial direction of the disc. Hereby, it is particularly attained that for generating the welding connection, a sufficiently large contact area between the sealing ring and the disc is provided wherein simultaneously the part of the sealing ring to be compressed in radial direction maintains a sufficient size in radial direction.

Furthermore, it is provided that the sealing ring is welded to the disc such that in relation to the welding build-up the projection of the sealing ring is larger radially inwards than radially outwards. In this way the radially inwards part of the sealing ring serving for the sealing effect is relatively large, the radially outwards directed projection of the sealing ring beyond the welding build-up serves only for balancing the tolerances at the side of the sealing ring, and for balancing inaccuracies when placing the sealing ring onto the welding build-up prior to the welding operation. The radially outwards projecting part of the sealing ring has no function for the sealing effect.

In order to avoid any non-desired wedging of parts of the radially inner area of the sealing ring when plugging the disc onto the connection piece, it is provided that the disc comprises a rounding and/or bevelling at the inner circumference defining the aperture with the rounding and/or bevelling beginning at the side comprising the welding. Hereby, it is particularly attained that the disc fits not too tight at the connection piece. This is of particular importance in case the disc is a part of a filter insert which by means of a snap-in connection to the lid of a filter housing is drawn out of the housing for filter maintenance. In this case it has to be ensured that the friction force between the disc and the sealing ring thereof on the one hand, and the connection piece on the other hand, is smaller than the tensile force transferred by the snap-in connection between the lid and the filter insert.

Furthermore the invention provides that the cross-section of the sealing ring in the unstressed and unwelded condition thereof has a height in axial direction which at least is 20% of its width in radial direction. By this relative dimensioning of the sealing ring, it is attained in particular that the sealing effect is attained by upsetting and compressing the radially inner area of the sealing ring, and that simultaneously a non-desired folding and wedging of the radially inner part of the sealing ring is prevented.

The welding build-up as viewed in circumferential direction may as an alternative be formed of several welding build-up sections lined-up one after the other instead of being integral. This embodiment of the disc with the lined-up welding build-up section may be particularly practical in case the disc is manufactured of thermoplastic material in an injection molding process. By the division of the welding build-up in welding build-up sections which are separated from each other, however, preferably are only slightly spaced, deformation of the discs are avoided as they may occur when cooling the plastic material after the injection molding process. In this way, an exact dimensioning of the disc is guaranteed. The division of the welding build-up has no negative impact on the function of the sealing and on the support of the sealing ring.

In an embodiment, the present invention provides a combination disc and sealing ring for a filter assembly that comprises an annular thermoplastic disc comprising a central aperture. The disc comprises an upper side and a flat lower side. The upper side of the disc comprises an annular thickened area that extends upward from the upper side of the disc and that is spaced radially outward from the aperture of the disc. The annular thickened area is thermally welded to a sealing ring. The sealing ring has a height; the annular thickened area of the disc has a height; the height of the annular thickened area being at least one third the height of the sealing ring. The sealing ring further comprises a central aperture having a common axis with the central aperture of the disc. The sealing ring further comprises a compressible area radially disposed between the aperture of the sealing ring and the thickened area of the disc.

In an embodiment, the sealing ring is fabricated from a material selected from the group consisting of plastic and fleece.

In an embodiment, the compressible area of the sealing ring is compressible in a radially outward direction.

In an embodiment, the annular thickened area is integral with the disc.

In an embodiment, the annular thickened area extends upward perpendicularly from the upper side of the disc.

In an embodiment, the annular thickened area comprises a circular inside wall that faces the common axis of the central apertures of the disc and the sealing ring.

In an embodiment, the annular thickened area has a rectangular cross section.

In an embodiment, the annular thickened area comprises a radial width and the sealing ring comprises a radial width. The radial width of the annular thickened area ranging from 15% to 45% of the radial width of the sealing ring.

In an embodiment, the aperture of the sealing ring is spaced radially inwards from the aperture of the disc.

In an embodiment, the disc comprises an interior wall disposed between the upper and lower sides thereof that define the central aperture of the disc. The interior wall is beveled outwardly as the interior wall extends upward from the lower side of the disc to the upper side of the disc.

In an embodiment, the interior wall curves outwardly as it meets the upper side of the disc.

In an embodiment, the height of the annular thickened area is at least 20% of the radial width of the annular thickened area.

In an embodiment, the annular thickened area comprises a plurality of closely spaced circumferential sections.

In an embodiment, the lower side of the disc is thermally welded to a cylindrical filter body. The central aperture of the sealing ring matably receives a connection piece. The compressible area of the sealing ring is compressed in a radially outward direction towards the annular thickened area of the disc as the sealing ring and disc are sandwiched between the connection piece and the filter body.

In an embodiment, the connection piece comprises a lower end that is beveled in a radially inward direction as the connection piece extends downward.

Other objects and advantages of the present invention will become apparent upon reading the following detailed description and appended claims, and upon reference to the accompanying drawings.

BRIEF DESCRIPTION OF THE DRAWING

An embodiment of the invention subsequently is further explained referring to a drawing. The Figures of the drawing illustrate.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
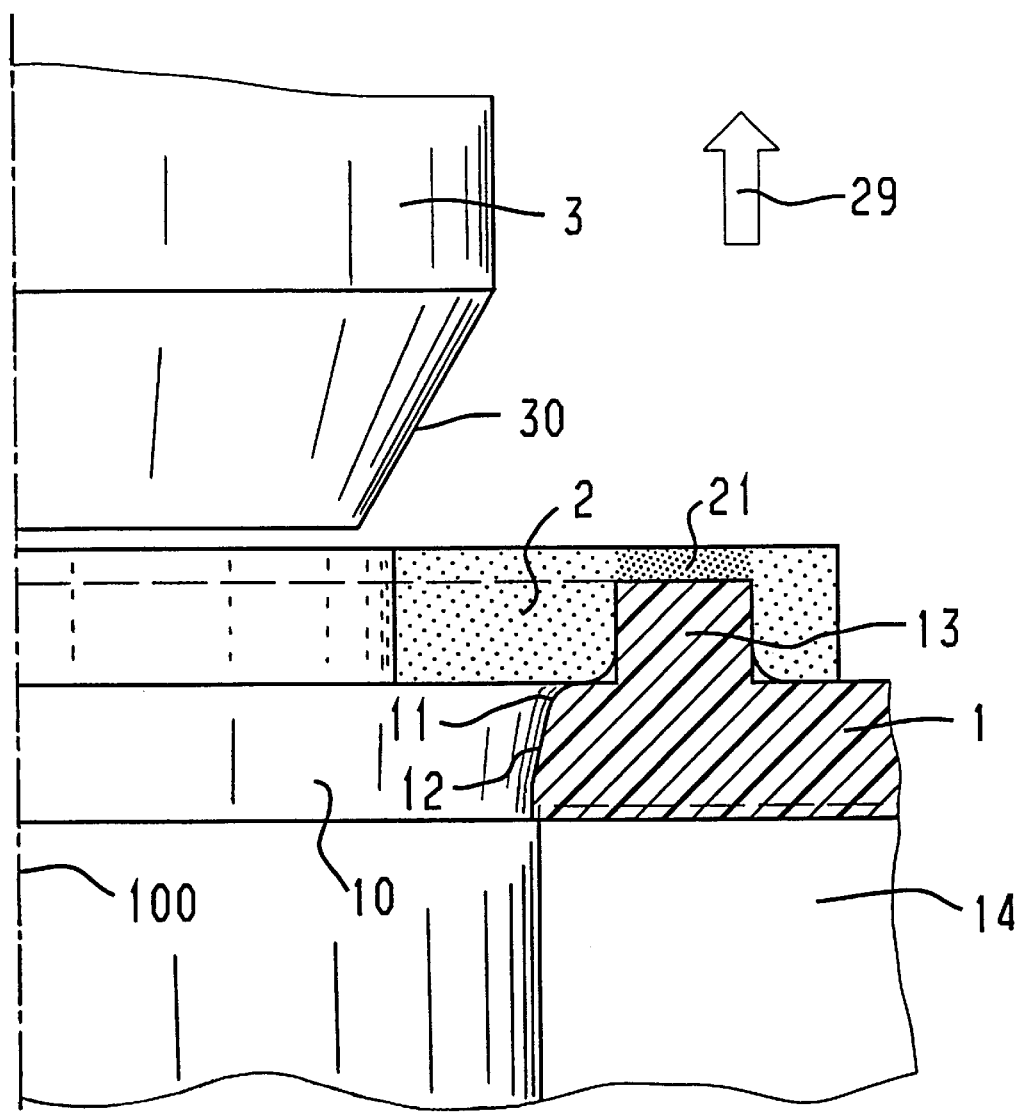
FIG. 1 illustrates a disc with a sealing ring prior to plugging the disc onto a connection piece in a part cross-section.

FIG. 1 of the drawing in the right lower part thereof illustrates a part of a disc 1 which is a part of a filter insert not illustrated which beside the disc 1 encompasses a filter material body 14. The filter material body 14 extends from the disc 1 downwards and is connected to the disc 1 in a sealing fashion preferably by thermal welding. A further disc is connected to the other end of the filter material body 14 in the same way (not illustrated) as it is common with filter inserts.

The disc 1 comprises in the center thereof an aperture 10; the aperture 10 and the disc 1 are rotation-symmetrical in relation to the longitudinal middle axis 100.

Figure 4:
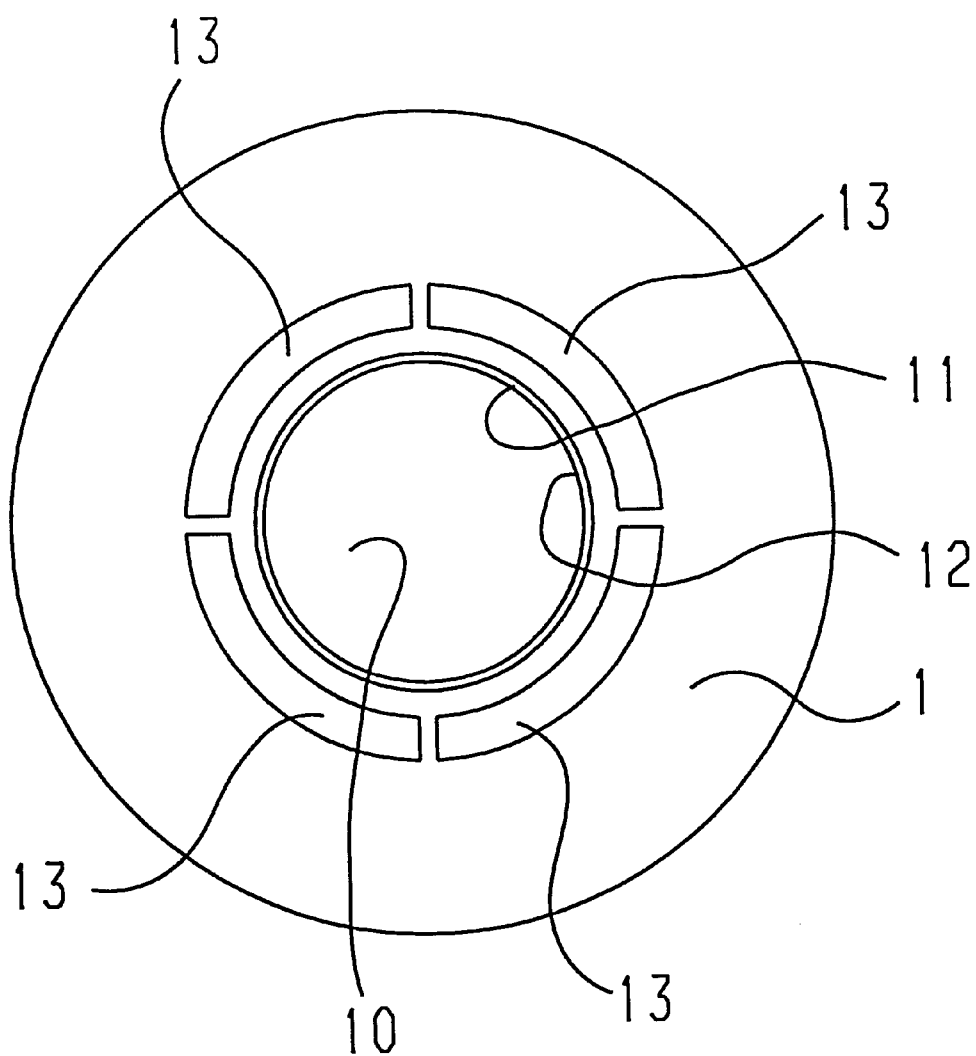
FIG. 4 is a top plan view of the annular disk illustrated in FIGS. 1–3.

At the flat side of the disc 1 which points upwards in the drawing and faces away from the filter material body 14 a welding build-up or annular thickened area 13 extends upwards and comprises a rectangular cross-section with the welding build-up integral with the remaining disc 1. The disc 1 incorporating its welding build-up 13 preferably is an injection molding part of thermoplastic material e.g. polyamide. The welding build-up 13 may be continuous in circumferential direction of the disc 1, as an alternative the welding build-up 13 as viewed in circumferential direction of the disc 1 may be consisting of several lined-up welding build-up sections with short discontinuations inbetween to form an annular thickened area having a plurality of closely spaced circumferential sections as shown in FIG. 4. These discontinuations avoid a deforming of the disc 1 when cooling it after the injection molding process.

Furthermore a sealing ring 2 is attached at the disc 1 wherein the connection between the sealing ring 2 and the disc 1 in the area of the upper side of the welding build-up 13 is attained by a thermal welding 21. The sealing 2 comprises the form of an flat annular ring with a rectangular cross-section wherein the projection in radially inwards direction (towards the left side in the drawing) is larger than the projection radially outwards (to the right in the drawing) as viewed in relation to the welding build-up 13.

Furthermore the FIG. 1 illustrates that the welding build-up 13 is offset radially outwards and arranged around the aperture 10 at the disc 1. At the transfer area from the upper side of the disc 1 radially inwards of the welding build-up 13 in the aperture 10 there is a rounding 11 continuing downwards into a bevelling 12 which approximately extends to the lower flat side of the disc 1.

At the left upper part in the FIG. 1 the lower part of the connection piece 3 is visible comprising a conical inlet bevelling 30. The disc 1 or the associated filter insert, respectively, may be plugged onto this connection piece 3 in direction of the arrow 29.

Figure 2:
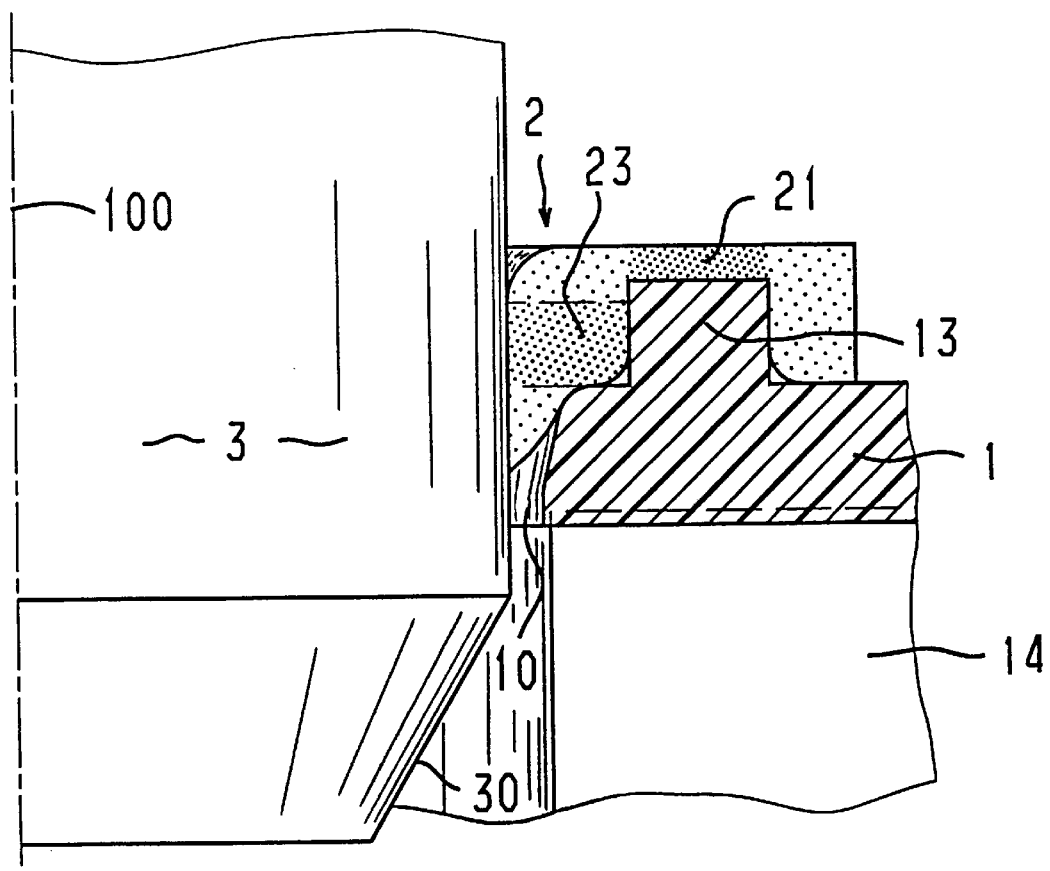
FIG. 2 illustrates the disc of FIG. 1 after plugging it onto the connection piece in the same view as in FIG. 1.

FIG. 2 illustrates the condition of the disc 1 with its sealing ring 2 after having plugged the disc onto the connection piece 3. The connection piece 3 with its conical end 30 projects through the aperture 10 into the interior of the filter material body 14. The sealing ring 2 between the outer circumference of the connection piece 3 and the disc 1 serves for the sealing against the penetration of a medium through the gap between the parts mentioned. This medium may be fuel or oil for an internal combustion engine as an example.

As FIG. 2 illustrates the sealing ring 2 in its area between the connection piece 3 and the welding build-up 13 is compressed which is indicated in the drawing by a higher density of points. Furthermore the sealing ring 2 is deformed to a certain degree by the plugging operation, in particular it is displaced downwards in the radial inner circumferential area thereof. Therein a part of the sealing ring 2 gets sandwiched into the angular gap between the inner circumference of the disc 1 below the welding build-up 13 and the outer circumference of the connection piece 3 wherein in this case the material of the sealing ring 2 is not compressed and does not serve for the sealing. This is indicated in the drawing by a smaller density of the points. The sealing effect is attained by the compression area 23 which in turn is attained by the upsetting in radially outwards direction, and compressing the material of the sealing ring 2 at the level of the welding build-up 13.

Figure 3:
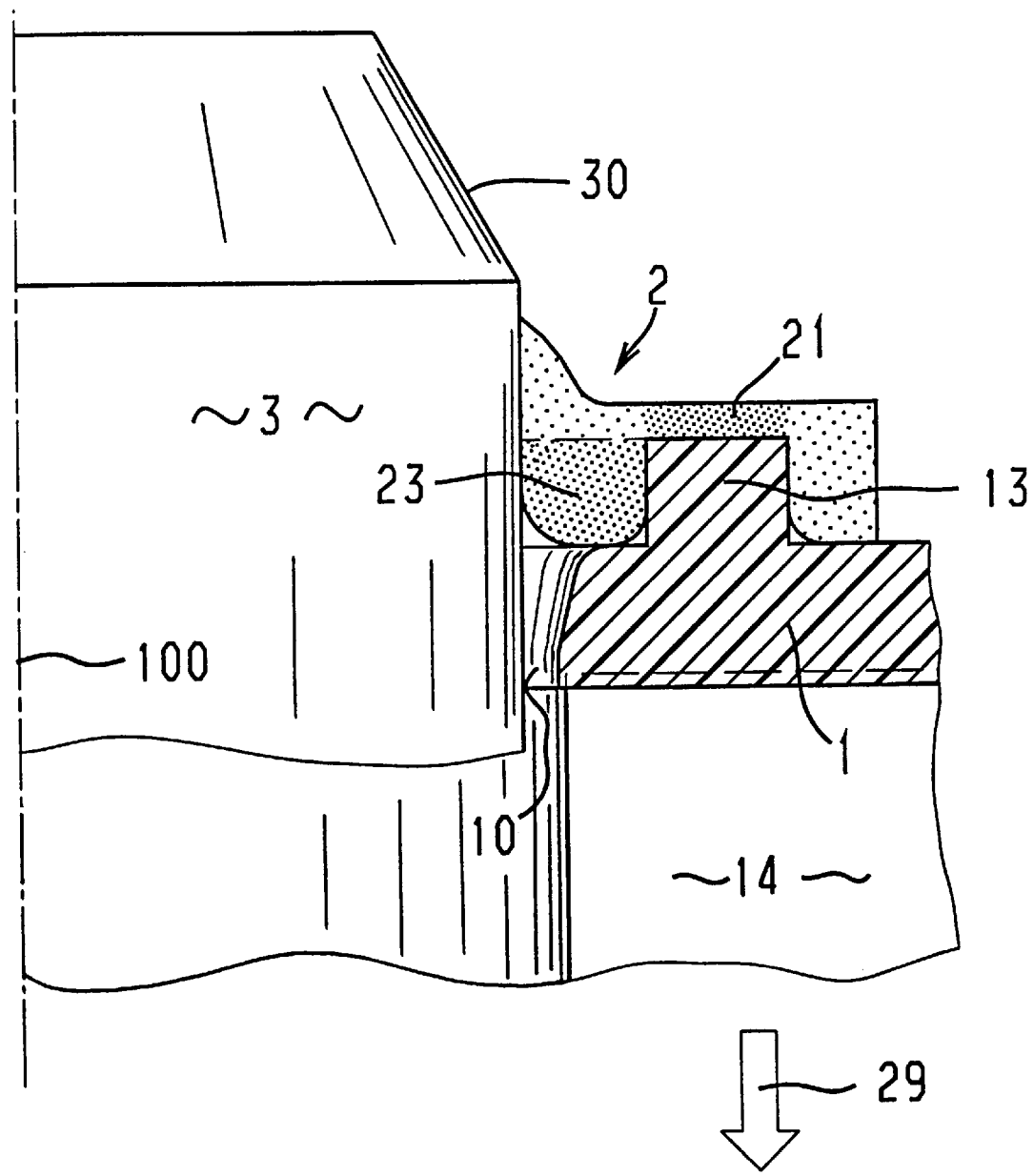
FIG. 3 illustrates the disc after plugging it onto a connection piece with a reverse plugging direction in relation to FIG. 2, also in a part cross-section.

In FIG. 3 of the drawing an application example of the disc 1 or the associated filter insert, respectively, is illustrated wherein a plugging of the disc 1 with its sealing ring 2 onto the connection piece 3 is attained in reverse direction according to the arrow 29' as compared with FIGS. 1 and 2. Herein the disc 1 with its sealing ring 2 is moved in relation to the connection piece 3 such that the conical end 30 of the connection piece 3 penetrates from the bottom upwards through the aperture 10. As it is obvious in FIG. 3 the radially inner part of the sealing ring 2 is hereby displaced upwards to a certain degree; but also in this application of the disc 1 with its sealing ring 2 a reliable sealing between the disc 1 and the connection piece 3 is attained by the sealing ring 2. Also in this case the radially inner part of the sealing ring 2 between the flank of the welding build-up 13 facing the connection piece 3 and the outer circumference of the connection piece 3 is compressed in radial direction and forms a compression area 23 which has a sealing capacity against the medium. The disc 1 with the connection build-up 13 and the sealing ring 2 welded thereto are not different from the constructions according to the FIGS. 1 and 2.

It will be also noted from FIG. 1 that the annular thickened area 13 forms an inside wall 42 that faces the common axis 100 of the disc 1 and sealing ring 2. Further, the lower side 40 of the disc 1 may be thermally welded to the filter body 14. Also, the annular thickened area 13 extends perpendicularly upward from the upper side 41 of the disc 1.

From the above description, it is apparent that the object of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A combination disc and sealing ring for a filter assembly, the combination comprising:

an annular thermoplastic disc comprising a central aperture, the disc comprising an upper side and a flat lower side, the upper side of the disc comprising an annular thickened area that extends upward from the upper side of the disc and that is spaced radially outward from the aperture of the disc, the annular thickened area being thermally welded to a sealing ring, the sealing ring having a height, the annular thickened area of the disc having a height, the height of the annular thickened area being at least one third the height of the sealing ring, the sealing ring comprising a central aperture having a common axis with the central aperture of the disc, the sealing ring further comprising a compressible area radially disposed between the aperture of the sealing ring and the thickened area of the disc.

2. The combination of claim 1 wherein the sealing ring is fabricated from plastic.

3. The combination of claim 1 wherein the compressible area of the sealing ring is compressible in a radially outward direction.

4. The combination of claim 1 wherein the annular thickened area is integral with the disc.

5. The combination of claim 1 wherein the annular thickened area extends upward perpendicularly from the upper side of the disc.

6. The combination of claim 5 wherein the annular thickened area comprises a circular inside wall that faces the common axis of the central apertures of disc and sealing ring.

7. The combination of claim 5 wherein the annular thickened area has a rectangular cross section.

8. The combination of claim 1 wherein the annular thickened area comprises a radial width and the sealing ring comprises a radial width, the radial width of the annular thickened area ranging from 15% to 45% of the radial width of the sealing ring.

9. The combination of claim 8 wherein the height of the annular thickened area is at least 20% of the radial width of the annular thickened area.

10. The combination of claim 1 wherein the aperture of the sealing ring is spaced radially inwards from the aperture of the disc.

11. The combination of claim 1 wherein the disc comprises an interior wall disposed between the upper and lower sides thereof, the interior wall defining the central aperture of the disc, the interior wall being beveled radially outwardly as the interior wall extends upward from the lower side of the disc to the upper side of the disc.

12. The disc of claim 11 wherein the interior wall curves radially outwardly as it meets the upper side of the disc.

13. The combination of claim 1 wherein the annular thickened area comprises a plurality of closely spaced circumferential sections.

14. A filter insert assembly comprising:
an annular thermoplastic disc comprising a central aperture, the disc comprising an upper side and a flat lower side,
the upper side of the disc comprising an annular thickened area that extends upward from the upper side of the disc and that is spaced radially outward from the aperture of the disc, the annular thickened area being thermally welded to a sealing ring,
the sealing ring having a height, the annular thickened area of the disc having a height, the height of the annular thickened area being at least one third the height of the sealing ring,
the sealing ring comprising a central aperture having a common axis with the central aperture of the disc, the sealing ring further comprising a compressible area radially disposed between the aperture of the sealing ring and the thickened area of the disc
the lower side of the disc being thermally welded to a cylindrical filter body,
the central aperture of the sealing ring matably receiving a connection piece, the compressible area of the sealing ring being compressed in a radially outward direction towards the annular thickened area of the disc as the sealing ring is sandwiched between the connection piece and the annular thickened area of the disc.

15. The assembly of claim 14 wherein the connection piece comprises a lower end that is beveled in a radially inward direction as the connection piece extends downward.

16. The sail assembly of claim 15 wherein the disc comprises an interior wall disposed between the upper and lower sides thereof that defines the central aperture of the disc, the interior wall defining the central aperture of the disc, the interior wall being beveled outwardly as the interior wall extends upward from the lower side of the disc to the upper side of the disc.

17. The assembly of claim 14 wherein the annular thickened area extends upward perpendicularly from the upper side of the disc.

18. The assembly of claim 17 wherein the annular thickened area comprises a circular inside wall that faces the common axis of the central apertures of disc and sealing ring.

19. The assembly of claim 18 wherein the annular thickened area has a rectangular cross section.

20. The assembly of claim 19 wherein the annular thickened area comprises a radial width and the sealing ring comprises a radial width, the radial width of the annular thickened area ranging from 15% to 45% of the radial width of the sealing ring.

21. A combination disc and sealing ring for a filter assembly, the combination comprising:
an annular thermoplastic disc comprising a central aperture, the disc comprising an upper side and a lower side,
the upper side of the disc comprising an annular thickened area that extends upward from the upper side of the disc and that is spaced radially outward from the aperture of the disc, the annular thickened area being connected to a sealing ring,
the sealing ring comprising a central aperture having a common axis with the central aperture of the disc, the sealing ring further comprising a compressible area radially disposed between the aperture of the sealing ring and the annular thickened area of the disc.

22. The combination of claim 21 wherein the compressible area of the sealing ring is compressible in a radially outward direction.

23. The combination of claim 21 wherein the annular thickened area is integral with the disc.

24. The combination of claim 21 wherein the annular thickened area extends upward perpendicularly from the upper side of the disc.

25. The combination of claim 24 wherein the annular thickened area comprises a circular inside wall that faces the common axis of the central apertures of disc and sealing ring.

26. The combination of claim 24 wherein the annular thickened area has a rectangular cross section.

27. The combination of claim 21 wherein the annular thickened area comprises a radial width and the sealing ring comprises a radial width, the radial width of the annular thickened area ranging from 15% to 45% of the radial width of the sealing ring.

28. The combination of claim 27 wherein the annular thickened area comprises a height and the sealing ring comprises a height, the height of the annular thickened area being at least one third the height of the sealing ring.

29. The combination of claim 28 wherein the height of the annular thickened area is at least 20% of the radial width of the annular thickened area.

30. The combination of claim 21 wherein the aperture of the sealing ring is spaced radially inwards from the aperture of the disc.

31. The combination of claim 21 wherein the annular thickened area comprises a plurality of closely spaced circumferential sections.

* * * * *